United States Patent
Kane

(10) Patent No.: US 9,140,302 B2
(45) Date of Patent: Sep. 22, 2015

(54) JOINT BEARING LUBRICANT SYSTEM

(71) Applicant: The Boeing Company, Chicago, IL (US)

(72) Inventor: Daniel J. Kane, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 13/917,334

(22) Filed: Jun. 13, 2013

(65) Prior Publication Data

US 2014/0369634 A1    Dec. 18, 2014

(51) Int. Cl.
| | | |
|---|---|---|
| *F16C 33/12* | (2006.01) |
| *F16C 33/10* | (2006.01) |
| *C22C 9/02* | (2006.01) |
| *F16C 33/14* | (2006.01) |
| *C22C 9/06* | (2006.01) |

(52) U.S. Cl.
CPC . *F16C 33/10* (2013.01); *C22C 9/02* (2013.01); *C22C 9/06* (2013.01); *F16C 33/102* (2013.01); *F16C 33/109* (2013.01); *F16C 33/121* (2013.01); *F16C 33/14* (2013.01); *F16C 2204/10* (2013.01); *F16C 2231/00* (2013.01); *F16C 2240/54* (2013.01); *F16C 2326/43* (2013.01)

(58) Field of Classification Search
CPC ..................................................... F16C 33/12
USPC ................................................. 384/276, 913
See application file for complete search history.

(56) References Cited

U.S. PATENT DOCUMENTS

| | | | |
|---|---|---|---|
| 3,343,953 A | 9/1967 | Hermann | |
| 3,929,396 A | 12/1975 | Orkin | |
| 3,945,695 A | 3/1976 | Speakman | |
| 3,974,988 A | 8/1976 | Whitworth | |
| 3,996,143 A | 12/1976 | Orkin | |
| 4,525,286 A | 6/1985 | Reick | |
| 4,641,976 A * | 2/1987 | Kar | 384/95 |
| 4,775,709 A | 10/1988 | Chandrasekaran | |
| 4,985,161 A | 1/1991 | Tohzuka | |
| 5,009,520 A | 4/1991 | Takajo | |
| 5,041,176 A | 8/1991 | Mikawa | |
| 5,707,718 A | 1/1998 | Matsukawa | |

(Continued)

FOREIGN PATENT DOCUMENTS

| | | |
|---|---|---|
| EP | 223268 B1 | 3/1989 |
| EP | 1288512 A2 | 3/2003 |

(Continued)

OTHER PUBLICATIONS

Arkell, Debby, "Making safe products even safer", Boeing Frontiers, Jul. 2006, vol. V, Issue III, p. 50.

(Continued)

*Primary Examiner* — Thomas R. Hannon
(74) *Attorney, Agent, or Firm* — Christopher J. Knors; Moore & Van Allen PLLC

(57) ABSTRACT

A bearing assembly is disclosed having a wearing surface formed from an alloying including tin, a wear material configured to be contacted by the wearing material during use, the wear material having a smoothed surface; and a lubricant composition comprising one or more additives having an affinity for tin. A method of providing superlubricious performance of a bearing assembly is also provided.

16 Claims, 6 Drawing Sheets

(56) References Cited

U.S. PATENT DOCUMENTS

| | | |
|---|---|---|
| 5,964,499 A | 10/1999 | Carter |
| 6,005,025 A | 12/1999 | Bhatia |
| 6,016,995 A | 1/2000 | Squires |
| 6,086,257 A | 7/2000 | Lee |
| 6,280,095 B1 | 8/2001 | Furukoshi |
| 6,296,393 B1 | 10/2001 | Yabe |
| 6,409,121 B1 | 6/2002 | Lindahl |
| 6,474,870 B1 | 11/2002 | Ni |
| 6,490,137 B1 | 12/2002 | Toyota |
| 6,729,763 B2 | 5/2004 | Post |
| 7,264,398 B2 | 9/2007 | Davies |
| 7,480,996 B2 | 1/2009 | Davies |
| 8,616,772 B1 * | 12/2013 | Kellar et al. ............ 384/129 |
| 2003/0039420 A1 | 2/2003 | Davies |
| 2005/0180669 A1 | 8/2005 | Kagohara |
| 2007/0269152 A1 | 11/2007 | Davies |
| 2009/0246072 A1 | 10/2009 | Nirasawa |
| 2012/0073712 A1 * | 3/2012 | Dewobroto et al. .......... 148/554 |
| 2014/0050844 A1 | 2/2014 | Hsu |
| 2014/0311633 A1 * | 10/2014 | Cribb et al. ............ 148/554 |

FOREIGN PATENT DOCUMENTS

| | | |
|---|---|---|
| EP | 2105512 A1 | 9/2009 |
| GB | 1065294 A | 4/1967 |
| GB | 2411211 A | 8/2005 |
| JP | 06229426 A | 8/1994 |
| WO | WO 2012/115953 A1 | 8/2012 |

OTHER PUBLICATIONS

Hu et al., "Synergistic antiwear properties between borates and organic tin compounds in lubricant", Petrolem & Coal 49 (2), 2007, pp. 80-85.

Weber et al. "Lead-Free Wrought Copper Alloys for Bushings and Sliding Elements", InTech, Mar. 2012, pp. 69-92.

European Patent Office, European Patent Application No. 14162267.0, European Search Report dated Nov. 3, 2014, 7 pages.

* cited by examiner

JOINT BEARING LUBRICANT SYSTEM

TECHNICAL FIELD

The present disclosure relates to bearing assemblies, and more particularly to bearing assemblies having two bearing members movable relative to one another and specific lubricant composition and metal materials for these assemblies.

BACKGROUND

Some runways, e.g., in Russia or Afghanistan, are of a design or for other reasons, capable of causing heavy use and shorted life of the landing gear of aerospace vehicles. More specifically, in many third-world or remotely located cities, the runways suffer from frost heave in which the frozen ground displaced portions of the runway. As such, displacement between portions of the runway causes the runway to be bumpy and rough. When an aircraft lands on these rough runways, the landing gear pivot joints absorb forces applied to the landing aircraft by the bumps. As the joints absorb the force, components of the joint (e.g., bearings) are heated and can be thermally affected (e.g., in or between the components). Lubricants with lead additives in the landing gear joints provide some protection for such joints, however, lead additives can no longer be used due to their environmental concerns.

Polytetrafluoroethylene (PTFE) liners or grease with PTFE particles have also been used, typically positioned in the landing gear joints in place of the lead lubricants, however, use of PTFE was discontinued in favor of more frequent lubrication of the joints. Even with more frequent lubrication, in colder climates, heated tents may need to be employed, positioned about the landing gear joints, to warm the landing gear to allow the lubricant to be pumped in. Nonetheless, components in the landing gear are expensive and time-consuming, which can include in some circumstances, replacement each month, as constantly needing to lubricate the assembly. The problem with rough runways and the effect on landing gear has been around for decades, and an acceptable, long-term solution has not yet been discovered.

SUMMARY

According to the present disclosure, a bearing assembly is provided. The bearing assembly comprising a wearing surface formed from an alloy including tin; a wear material configured to be contacted by the wearing surface during use, the wear material having a smoothed surface; and a lubricant composition comprising one or more additives having an affinity for tin.

In a second embodiment, an assembly is provided. The assembly comprises a pair of members movable relative to one another, the pair including a first member and a second member that define a space there between, at least one of the first member or the second member being a spinodal alloy comprising copper, nickel, and tin; and at least one of the first member or the second member having a measured root mean squared surface roughness (Rq) less than 3 microinches (uin) to about 0, and/or a maximum surface roughness (Rmax) less than 30 uin to about 0 and/or an average maximum height surface roughness (Rz) less than 20 uin to about 0; and a lubricant composition positioned in the space, the lubricant composition comprising one or more boron or borate additives.

In a third embodiment, a bearing assembly for a truck pivot joint in a landing gear assembly is provided. The bearing assembly comprising a metallic truck assembly defining an opening therein; a pin rotatably positioned in the opening of the truck assembly, the pin having a measured root mean squared surface roughness (Rq) less than 3 microinches (uin) to about 0, and/or a maximum surface roughness (Rmax) less than 30 uin to about 0 and/or an average maximum height surface roughness (Rz) less than 20 uin to about 0; and a truck pivot bushing comprised of a spiniodal alloy including tin, the truck pivot bushing positioned at least partially in the opening defined by the truck assembly, the truck pivot bushing having an inner surface proximate the pin such that a space is defined between the inner surface of the truck pivot bushing and the pin, at least a surface of the pin or the truck pivot bushing having a coating of a lubricant composition comprising a boron or borate additive occupying the space defined between the pivot bushing and the pin.

In a fourth embodiment, contacting, with a lubricant composition comprising one or more additives having an affinity for tin, at least a surface of a wear material or a wearing surface, the wear material configured to be contacted by the wearing surface during use, the wear material having a smoothed surface, and the wearing surface formed from an alloy including tin.

BRIEF DESCRIPTION OF THE DRAWINGS

Reference will now be made to the accompanying drawings, which are not necessarily drawn to scale, and wherein.

DETAILED DESCRIPTION

Figure 1:
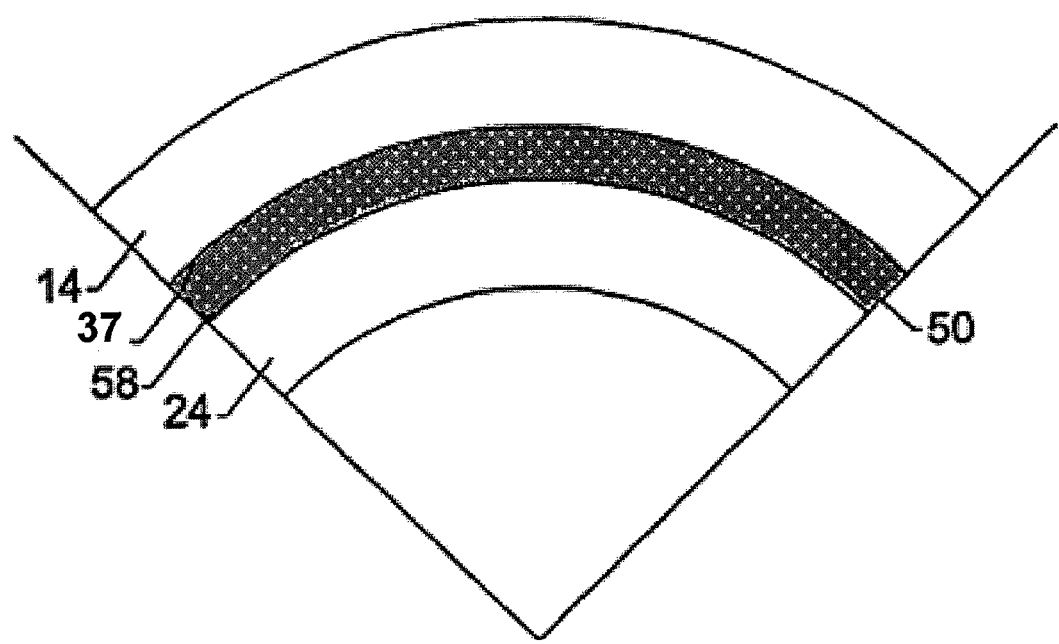
FIG. 1 is a cross-sectional view of a bearing assembly according to one embodiment of the present disclosure as viewed along line 1-1 of FIG. 3.
Figure 2:
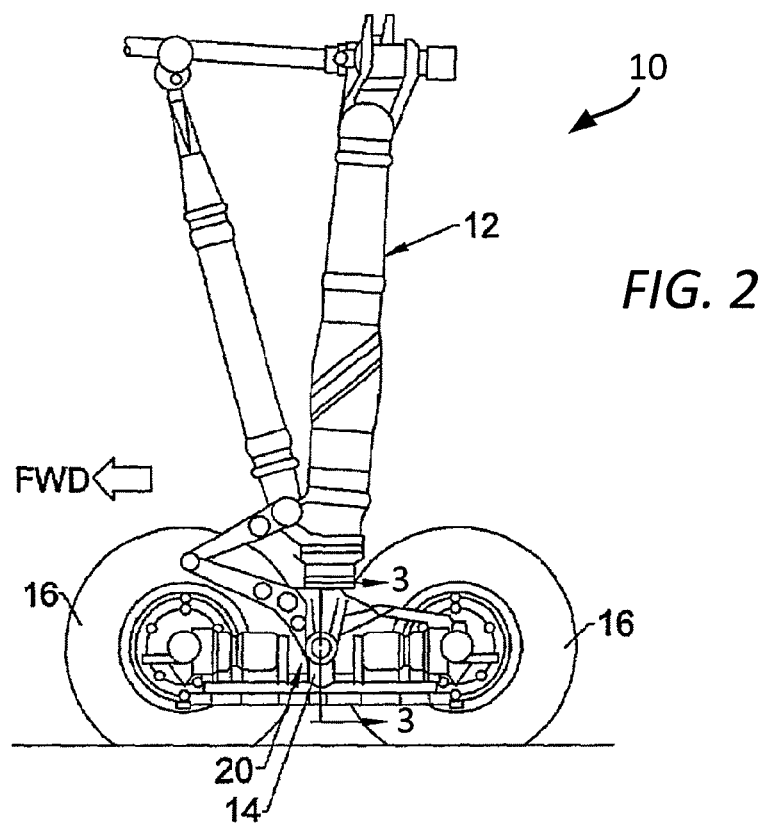
FIG. 2 is a side view of a landing gear assembly for an aerospace vehicle according to one embodiment of the present disclosure.

In a conventional bearing/joint assembly, low density of additives are employed that generally bond with wearing material with the strength of such bonding varying between strong and weak. Likewise, in the conventional assembly, higher roughness leads to metal-to-metal contact but better retention of lubricant. With relatively few additives keeping materials apart, the parts contact with relatively high contact stress and higher friction values, with the additives carrying only some of load. Changing the wear material to spinodal alloy comprising tin in combination with a lubricant composition with one or more additives having an affinity for tin is observed, but not bound by any theory, to create an ultrahigh density, ultra strong wear layer that reduces friction by having the one or more additives carry much of the load. Nonetheless, high surface roughness of the wear material provides for breaks to the boundary layer in locations at the interface causing friction and/or elevated temperatures in localized locations at the interface. While improvement is realized by transitioning the wearing material to a spinodal alloy, further improvement is realized by using a lubricant composition with one or more additives and more improvement is provided by reducing roughness. The present system, compositions, and methods provide additional improvements and advantages to the above by modification of the surface roughness of the wearing material.

The instant system, composition, and method provides for a near zero-friction bearing assembly and/or joint suitable for aerospace landing gear that resists heat up, even in the most extreme landing conditions. As such, the instant bearing assembly and/or joint prevents or eliminates damage to one or more components of the bearing assembly and/or joint for aerospace vehicles. The bearing assembly of the present disclosure is particularly advantageous for use in extreme conditions, such as where the bearing assembly is subjected to relatively large dynamic pressures and oscillations. For example, truck pivot joint bearing assemblies used in aircraft landing gear are prime candidates for employing the teachings of the bearing assembly of the present disclosure, as truck pivot joint bearing assemblies may encounter relatively large dynamic pressures and oscillations during landing cycles. Of course, the bearing assembly of the present disclosure can also be used in many other applications where the loading conditions are not extreme, as the longer lubrication and bearing life is appreciable in a broad range of applications. Thus, the present disclosure provides a bearing assembly having an improved bearing life and requiring less frequent maintenance cycles to the bearing components, a lower coefficient of friction compared to conventional grease lubricants, and consequently a delaying of the onset of heat buildup and loss of lubricity in the bearing assembly.

By contrast, using a greaseless coating (i.e., a relatively thick coating or TEFLON™, as taught by conventional bearings) between the bearing members can result in unwanted play between the surfaces of the bearing assembly as the coating wears away. Thus, the bearing assembly of the present disclosure provides a clear advantage over conventional bearing assemblies and lubrication techniques.

As used herein, "wear material" is inclusive of a "wear surface," which may be the same or different compositionally than its corresponding wear material. For example, the wear material may comprise a surface treatment resulting in a wear surface that is compositionally different than the bulk wear material. The terms "wear material" and "wear surface" are used interchangeably herein unless otherwise indicated. Likewise, as used herein, "wearing material" is inclusive of a "wearing surface," which may be the same or different compositionally than its corresponding wearing material. The terms "wearing material" and "wearing surface" are used interchangeably herein unless otherwise indicated.

Spinodal Alloys as Components for Bearing/Joint Assemblies

Typical bearing assemblies include a pair of bearing members (a wearing surface and a wear surface) that are movable relative to one another. In one specific example, a bearing or bushing can be a cylindrical shell, with or without a flange, installed in a structural housing in conjunction with a mating shaft, pin, or bolt. Bearings having pinned joints typically are used for cyclic and oscillatory motion, such as used in landing gear joints, control surface hinge points, and actuating linkages.

The advantages of such bearings are numerous. Bearings are relatively economical replacement elements that extend the useful life of major structural elements by providing protection from wear, corrosion, deformation, and other service-limiting or failure-initiating damage. The two basic considerations for successful service performance of a bearing are strength and life. Strength is the capability of the bearing to resist deformation and structural failure under static load. The life of the bearing is determined by its ability to resist wear, fretting, galling, and seizure under cyclic or oscillating motion. The presently disclosed systems, compositions, and methods provide improvements to such bearing systems, however, they are not limited to bearing systems.

In one aspect, one or more of the components of the bearing/joint assembly comprises a spinodal alloy. Spinodal alloys typically exhibit an anomaly in their phase diagram called a miscibility gap and within the very narrow temperature range of the gap atomic ordering takes place within the existing crystal lattice structure. For example, most copper-base alloys develop high strength from solid solution hardening, cold working, precipitation hardening, or by a combination of these strengthening mechanisms. However, in the ternary copper-nickel-tin alloys, high mechanical strength is produced by a controlled thermal treatment sometimes referred to as spinodal decomposition, where two new phases form of similar crystallographic structure but of different chemical composition. The resulting two-phase structure of such a spinodal alloy is structurally stable at temperatures significantly below the gap. Spinodal alloys are prepared typically by providing a cast or wrought material, solution heat treating the material, permitting partial or full homogenization and annealing of the material, followed by a high-speed quench to freeze a fine grain structure. Subsequently, the material is then age-hardened by raising the material to a temperature within the miscibility gap In one embodiment, the instant system, compositions, and methods include a tin (Sn) spinodal alloy bushing. In one aspect, the bushing can be a spinodal copper-nickel-tin ("Cu—Ni—Sn") alloy. The spinodal process forms a matrix of Sn in the alloy such that the density of Sn is higher in the spinodal alloy than it is in a non-spinodal alloy. In a further aspect, a pin inserted into the bushing has a smooth outer surface. In yet a further aspect, the instant system, compositions, and methods further comprise a lubricant composition with one or more additives having an affinity for tin (Sn). In one aspect, the wearing material and wear material are both spinodal alloys, of the same or of different Cu—Ni—Sn composition. Suitable spinodal copper-nickel-tin alloy designations and respective chemical composition by weight percent (excluding low alloying elements) include, for example, C72650 (Cu (remainder), Ni 7.0% to 8.0%, Sn 4.5% to 5.5%); C72700 (Cu (remainder), Ni 8.5% to 9.5%, Sn 5.5%-6.5%); C72900 (Cu (remainder), Ni 14.5% to 15.5%, Sn 7.5% to 8.5%); C96900 (Cu (remainder), Ni 14.5% to 15.5%, Sn 7.5% to 8.5%); and C96970 (Cu (remainder), Ni 8.5% to 9.5%, Sn 5.5% to 6.5%). Other spinodal copper-nickel-tin alloys useful in the practice of the instant system, composition, and method can be designated by industry specifications including, for example, AMS4596, AMS4597, ASTM-B505, ASTM-B929, and ASTM B740 or commercially available materials under the trade names including, but not limited to, ToughMet MoldMax XL®, Toughmet 3AT®, Toughmet 3TS®, Toughmet 2CX®, or Toughmet 3CX® (Materion Corporation, Cleveland, Ohio).

Lubricant Compositions

The lubricant composition can comprise an appropriate base stock suitable for application between contacting members of an assembly. The base stock can be any petroleum-derived lubricant as well as any synthetic lubricant, such as silicones, polyesters, poly alpha olefins (PAOs), and the like. The base stock can be adjusted in viscosity, for example, as a grease. The lubricant composition can comprise one or more boron and/or boronate compounds.

The one or more boron and/or boronate additives can be derived from a boron-containing compound. Boron-containing additives may be prepared, for example, by reacting a boron compound with an oil-soluble or oil-dispersible additive or compound. Suitable boron compounds include boron oxide, boron oxide hydrate, boron trioxide, boron trifluoride, boron tribromide, boron trichloride, boron acid such as boronic acid, boric acid, tetraboric acid and metaboric acid, boron hydrides, boron amides and various esters of boron acids. Additional examples of boron-containing additives include a borated dispersant; a borated dispersant VI improver; an alkali metal or a mixed alkali metal or an alkaline earth metal borate; a borated overbased metal detergent; a borated epoxide; a borate ester; a sulfurised borate ester; and a borate amide.

Boron-containing additives include borated fatty amines. The borated amines may be prepared by reacting one or more of the above boron compounds with one or more of fatty amines, e.g., an amine having from four to eighteen carbon atoms. They may be prepared by reacting the amine with the boron compound. Borated fatty epoxides are generally prepared by the reaction product of one or more of the above boron compounds with at least one epoxide, generally an aliphatic epoxide having from 8 to 30, preferably from 10 to 24, more preferably from 12 to 20, carbon atoms. Examples of useful aliphatic epoxides include heptyl epoxide and octyl epoxide. Mixtures of epoxides may also be used, for instance commercial mixtures of epoxides having from 14 to 16 carbon atoms and from 14 to 18 carbon atoms.

Borated dispersants may be prepared by boration of succinimide, succinic ester, benzylamine and their derivatives, each of which may have an alkyl or alkenyl group of molecular weight of 700 to 3000. Other molecular weight alkyl or alkenyl groups can be used. Processes for manufacture of these additives are known to those skilled in the art.

Borate esters of aliphatic, acyclic, aryl, naphtly, and heterocyclic groups may be used, which are prepared by reacting one or more of the above boron compounds with one or more alcohols, amines, heterocycles, and/or acids containing from 6 to 30, or from 8 to 24, carbon atoms. The borate esters can be borated phospholipids. The methods of making such borate esters or phospholipids are known in the art.

Alkyl groups for the above boron additives includes straight or branched chain and is for example methyl, ethyl, n-propyl, iso-propyl, n-butyl, isobutyl, sec-butyl, t-butyl, n-pentyl, isopentyl, n-hexyl, n-heptyl, 3-heptyl, n-octyl, 2-ethylhexyl, n-nonyl, n-decyl, undecyl, n-dodecyl, tridecyl, n-tetradecyl, pentadecyl, n-hexade-cyl, n-octadecyl, n-eicosyl, heptadecyl, 2-ethylbutyl, 1-methylpentyl, 1,3-dimethylbutyl, 1,1,3,3-tetramethylbutyl, 1-methyl hexyl, isoheptyl, 1-methylheptyl, 1,1,3-trimethylhexyl and 1-methylundecyl.

Alkenyl groups for the above boron additives includes straight or branched chain and can be an unsaturated version of alkyl, for example allyl, prop-2-enyl, but-2-enyl, 2-methyl-prop-2-enyl, pent-2-enyl, hexa-2,4-dienyl, dec-10-enyl or eicos-2-enyl.

Cycloalkyl groups for the above boron additives includes, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cyclodecyl, adamantyl, cyclododecyl, cycloheptyl or cyclooctyl.

Aralkyl groups for the above boron additives includes for example benzyl, alpha-benzyl, α-dimethylbenzyl or 2-phenylethyl.

Aryl groups for the above boron additives includes for example phenyl or naphthyl. Substituted aryl is for example aryl substituted by 1 to 4 alkyl of 1 to 6 carbon atoms or hydroxy groups.

Alkaryl groups for the above boron additives for example o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-eth-ylphenyl, 4-tert-butylphenyl, 2-ethylphenyl, 2,6-diethylphenyl, 2,4-di-t-butylphenyl or 2,6-di-t-butyl-4-methylphenyl. Hydroxyphenyl can be for example 3-hydroxyphenyl.

Alkylated hydroxyphenyl group's for the above boron additives for example mono- or di-alkylated 3-hydroxyphenyl, for example 2-methyl-3-hydroxyphenyl, 4-methyl-3-hydroxyphenyl, 2-ethyl-3-hydroxyphenyl, 4-ethyl-3-hy-droxyphenyl, 2-t-butyl-3-hydroxyphenyl14-t-butyl-3-hydroxyphenyl, 2-hexyl-3-hydroxyphenyl]4-hexyl-3-hydroxyphenyl, 2,4-dimethyl-3-hydroxyphenyl, 2-methyl-4-t-butyl-3-hydroxyphenyl, and the other corresponding dialkylated versions.

Heterocyclic groups for the above boron additives can be 4-, 5-, or 6-membered heterocyclics with one or more oxygen, nitrogen, or sulfur atoms in combination with carbon atoms. The heterocyclic groups can be substituted with any of the above groups.

For example, suitable additives such as borated derivatives of ethoxylated amines and borates of mixed alcohols, amides, amines, hydroxy esters, ethoxylated amines, ethoxylated amides and hydroxyalkyl, hydroxyalkenylalkyl or alkenylimidazolines; borates of mixed ethoxylated amines and amides, hydroxyalkyl imidazolines, hydrolyzed hydroxyalkyl imidazolines and hydroxyesters; the product of reacting a borating agent with an ammoniated hydrocarbyl epoxide; boron-containing heterocyclic compounds prepared by reacting a primary amine or ammonia with an alkylene oxide or epoxide and then concurrently or subsequently reacting the intermediate with a boric acid, and/or borates with N,N-dialkylaminoethyl groups with alkyl radicals containing more than three carbon atoms, can be used.

In one aspect, the amount of boron contained in the lubricant composition is 0.1 to 5 mass percent (in one aspect, 0.2 to 2 mass percent boron). In an embodiment of each aspect of the present disclosure, copper-containing compounds, such as a copper carboxylate, as well as zinc-containing compounds, such as zinc dithiocarbamate, are substantially absent from the lubricant composition.

In one aspect, the one or more additives of the lubricant composition comprises boron or a borate additive, such boron or borate additive having an affinity for Sn. The term "affinity" as used herein refers generally to the boron or borate additive's ability to interact chemically, ionically, non-ionically, etc., with the Sn-containing surface of the spiniodal alloy, which can include native oxides, nitrites, etc. of Sn and/or other metals.

Specific borate containing lubricant compositions (which includes greases) include alkenyl amide borate and/or other borate additives, which are commercially available e.g., under the trade name VANLUBE® (Vanderbuilt, Norwalk, Conn.), or Rheolube 374A® grease (Nye Lubricants Inc. of Fairhaven, Mass.), or BRAYCOTE® 3214 grease (Castrol Industrial North American, Inc.).

Surface Treatments of the Wear Surface

In another embodiment, alone or in combination with the previous embodiments, the wear surface member of the bearing and/or joint system is provided with a smooth wear surface. The smooth wear surface can be formed from tungsten carbide, hard chrome, or other hard material and/or coating. The smoothness of the surface of the wear surface can have a root mean square (RMS) measured roughness (Rq) that is 3 microinches (uin) or less, or 1.5 uin or less. Other suitable surface roughness measurements include a maximum surface roughness (Rmax) and/or an average maximum height surface roughness (Rz). These other roughness measurement methods are not preferred as they may leave out random peaks that are included in the RMS measurement, although those methods can be used, provided the resultant wear surface roughness are as follows: Rq<3 uin, and/or Rmax<30 uin, and/or Rz<20 uin. In contrast, the surface of conventional wear surfaces, e.g., pins of an exemplary conventional bearing system are typically 4 uin-8 uin Ra, which is significantly rougher and includes random peaks of greater height obscured from the measurement that can protrude through the boundary layer of the lubricant resulting in wear. It is generally believed that the rougher 4 uin-8 uin Ra surface of a conventional pin in an exemplary bearing system is desired so that the lubricant can be captured/stored in the microcracks defined by the rough surface. The present system and method is therefore in contrast to conventional wisdom in the field that avoids overly smooth wear surface because it is thought that the overly smooth surface will cause less of the lubricant to be retained between the wear and the wearing surfaces, e.g., the pin and the bushing, and/or allow the respective metals to weld together if they come into contact.

While not to be held any particular theory, it is believed that changing at least the wearing material to a spinodal alloy comprising tin and of a surface roughness less than the boundary layer thickness of the lubricant between the wearing material and wear surface, in combination with a lubricant composition with one or more additives having an affinity for one of the elements of the spinodal alloy, creates an ultra high density, ultra strong wear layer that reduces friction to essentially zero and provides essentially no metal-metal contact between the wearing material in the non-wearing material of the system even at high stress conditions. The term "boundary layer" as used herein in the above context is the average thickness of the lubricant composition separating the wearing material and wear surface under operating conditions, and includes molecular-thick films on one or both surfaces. In certain aspects, the boundary layer, in the presence of asperities on one or both surfaces, carries a significant portion of the load and shields the asperities from wear and/or contact, for example, by repulsive forces between the boundary layers of lubricant on each respective surface.

In one aspect, the wearing material and wear surface are both spinodal alloys, with a layer of the lubricant composition therebetween, the lubricant composition comprising one or more additives having an affinity for at least one element of the spinodal alloy. In a further aspect of the above embodiment, the wearing material is a spinodal alloy comprising tin and of a measured surface roughness of Rq less than (RMS) <3 uin and/or Rmax <30 uin and/or Rz<20 uin., in combination with a lubricant composition with one or more additives having affinity for Sn.

Additionally surface treatments and methods of providing the aforementioned surface roughness to the wear surface include, without limitation, hard materials that are ground/polished/lapped and/or electropolished to a measured surface roughness of Rq less than (RMS)<3 uin and/or Rmax<30 uin and/or Rz<20 uin. Additional materials or surface treatments and/or coatings include but are not limited to martensitic stainless steel (e.g., 440C and 440C with fine grain refinement), XD15NW® alloy (AMS 5925), cobalt chrome plating, PRYROWEAR® 53 alloy (AMS 6308), Pyrowear® 675 alloy (AMS 5930), carburized or nitride surface treatments, 52100 steel, etc. These exemplary materials and surfaces treatments provide a hard surface suitable for achieving and maintaining the required surface roughness for the systems, compositions and methods disclosed herein.

In a further aspect, the wearing materials described above have an initial wearing surface having a measured root mean squared surface roughness (Rq) greater than 3 microinches (uin), and/or greater than a maximum surface roughness (Rmax) of 30 uin to and/or an average maximum height surface roughness (Rz) greater than 20 uin and the initial wearing surface of the wearing material is "broken in" by operating under load to an operating wearing surface having the properties above, e.g., a surface roughness of Rq (RMS) <3 uin and/or Rmax<30 uin and/or Rz<20 uin. "Operating" in this context includes normal operation under normal or expected conditions as well as operation outside the design parameters or expected conditions of the system. In one aspect, the initial wearing surface has a measured root mean squared surface roughness (Rq) between 3 to about 20 microinches (uin).

Superlubricious Bearing/Joint Design

In one aspect of any of the previous embodiments, a superlubricious bearing/joint system and a method of providing super lubricity properties to the same, is provided, where the wearing material, such as a bushing, comprises providing a spinodal alloy comprising tin (Sn) evenly distributed at the atomic level (e.g., nanoscale ordering of tin in Cu—Ni—Sn). The superlubricious bearing/joint system may further comprise a lubricant composition comprising one or more additives that have affinity for Sn, such as the borate additives described above and/or other borate additives). For example, the lubricant composition comprising one or more additives can be Braycote 3214 and Nye 374A. The wear surface of the superlubricious bearing/joint system is manufactured to a surface roughness (or smoothness) of Rq (RMS)<3 uin and/or Rmax<30 uin and/or Rz<20 uin. In an alternative embodiment, the superlubricious bearing/joint uses spinodal alloys against each other with the lubricant composition described above, the lubricant composition introduced between the wearing and wear surfaces as a single layer on one surface or as a dual layer on both surfaces. Methods to obtain the desired surface roughness include, but are not limited to, grinding, honing, polishing, and electropolishing.

In a further aspect, the wearing material has an initial wearing surface having a measured root mean squared surface roughness (Rq) greater than 3 microinches (uin), and/or greater than a maximum surface roughness (Rmax) of 30 uin to and/or an average maximum height surface roughness (Rz) greater than 20 uin and the initial wearing surface of the wearing material is "broken in" by operating under load to an operating wearing surface having the properties above, e.g., a surface roughness of Rq (RMS)<3 uin and/or Rmax<30 uin and/or Rz<20 uin. "Operating" in this context includes normal operation under normal or expected conditions as well as operation outside the design parameters or expected conditions of the system. In one aspect, the initial wearing surface has a measured root mean squared surface roughness (Rq) between 3 to about 20 microinches (uin) in combination with a wearing material having a surface roughness Rq (RMS)<3 uin and/or Rmax<30 uin and/or Rz<20 uin.

While not to be held any particular theory, it is believed that when the parts of the above superlubricious bearing/joint system move relative to each other, even at extreme pressures and velocities, the metals do not touch and extremely low frictions are achieved—frictions equal to or lower than rolling element bearings (superlubricity). As such, the above superlubricious bearing/joint system can be used to replace moving parts that typically used rolling element bearings. Examples applications of the present system, compositions, and methods include, for example, Rotary Actuators Track Rollers. In one aspect, the present disclosure provides for essentially zero-friction lubrication of a metal-metal contacting system. Because the presently disclosed systems, compositions, and methods provides a near zero-friction contact surface, the instant disclosure is useful for joints, such as for providing joints as alternatives to roller and ball bearings. In aerospace vehicles, this substitution can lead to many designs that were not previously possible due to the limitations imposed by the roller or ball bearings currently used.

Thus, in one aspect, the present disclosure provides a superlubricious boundary-lubricated plain bearing joint design. Such a design has numerous practical applications. Thus, the combination of a spinodal alloy comprising Sn, a lubricant, e.g., such as a grease, comprising one or more boron additives with an affinity for tin, and a defined surface texture on the hard wear surface provides a superlubricious joint system. This system is capable of preventing and/or eliminating issues with the landing gear truck pivot joints using runways with irregular surfaces, and enables new joint designs with plain joints that were not previously obtainable.

The present disclosure now will be described more fully hereinafter with reference to the accompanying drawings, in which preferred embodiments of the present disclosure are shown. This present disclosure may, however, be embodied in many different forms and should not be construed as limited to the embodiments superlubricious forth herein; rather, these embodiments are provided so that this disclosure will be thorough and complete, and will fully convey the scope of the present disclosure to those skilled in the art. Like numbers refer to like elements throughout.

FIG. 1 shows a bearing structure assembly 10 (as viewed along line 1-1 of FIG. 3), wherein lubricant composition 50 comprising one or more additives with an affinity for tin, is applied between bearing assembly members comprising a truck assembly 14 and a truck pivot pin 24 to lubricate the members as they move relative to one another. Specifically, the lubricant composition 50 is generally disposed (thickness is not to scale) between the inner surface 37 of the assembly 14 and the outer surface 58 of the truck pin 24.

One application where bearing structure assembly 10 may be employed is on a landing gear apparatus of an aerospace vehicle, and more particularly on truck pivot joint bearing assemblies for an aerospace vehicle's landing gear. The bearing assemblies used in this type of application typically include a relatively thick coating of grease between the moving surfaces of the bearing. This is acceptable for most circumstances because the dynamic bearing pressures and sliding velocities of the moving surfaces are relatively low. However, rough landing conditions, such as runways with deep cracks, crevices, potholes, and/or uneven surfaces, can cause excessive use of and wear on the truck pivot joint bearing assemblies from the rapid shocks and extreme oscillations these surface abnormalities transfer to the bearing assemblies. In some cases, it has been discovered that these rough conditions create as much as ten (10) times more energy than is generated under normal conditions. This additional energy is absorbed as heat by the bearing assemblies, which accounts for some or all of damage that occurs when using conventional bearing assemblies in these environments. As a result, the high temperatures generated in these conditions cause the grease packed between the moving surfaces of the bearing assemblies to break down and thus lose its effective lubricity. To prevent failure of the bearing assembly, time-consuming maintenance must be performed more frequently, which further adds to the cost of maintaining the aerospace vehicle in addition to the lost profits while the vehicle is under maintenance or repairs. Lubricant composition 50 applied between bearing assembly components is more resistant to dynamic bearing pressures and heat generation in extreme conditions, thus reducing or eliminating frequent maintenance.

In exemplary embodiments of the present disclosure, a landing gear assembly is described. However, the present disclosure is not limited to landing gear assemblies, in contrast, is applicable to any joint or bearing assembly within the scope of the present disclosure and appended claims. Thus, in this exemplary manner, FIGS. 2-5 show various views of portions of a metallic bearing structure assembly 10 of a portion of the landing gear for an aerospace vehicle. The bearing structure assembly 10 having a truck pivot joint that includes at least one shock strut 12 that is rotatably connected to the truck pivot pin 24. Specifically, the shock strut 12 defines an opening for rotatably receiving the truck pivot pin 24. The shock strut 12 also includes a distal portion called an inner cylinder fork 26 that extends away from the opening. The bearing structure assembly 10 as shown also includes bearing assembly component 20 that includes the truck assembly 14 that is rotatably connected to the truck pivot pin 24, with at least two pairs of wheels 16 attached to the truck assembly 14. Various modifications to the above assembly 10 are possible, indeed, likely with the use of the systems and methods of the present disclosure. Likewise, other gear assemblies with rotatably configured components that can employ the metal-lubricant-surface configurations are within the scope of the present disclosure.

Figure 3:
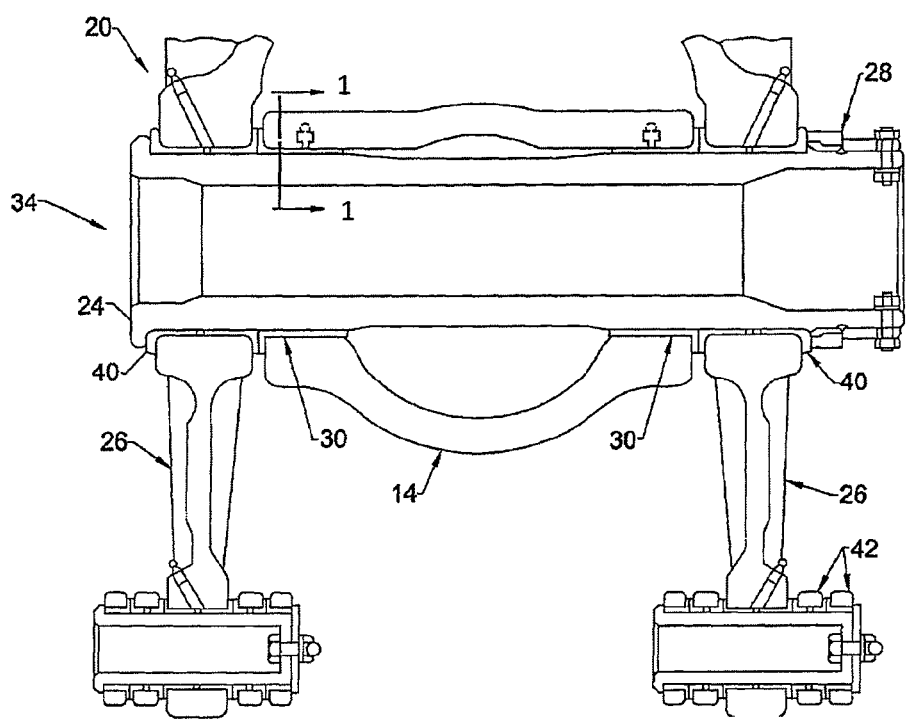
FIG. 3 is a cross-sectional view of a truck pivot joint bearing of the landing gear assembly as viewed along line 3-3 of FIG. 2.
Figure 4:
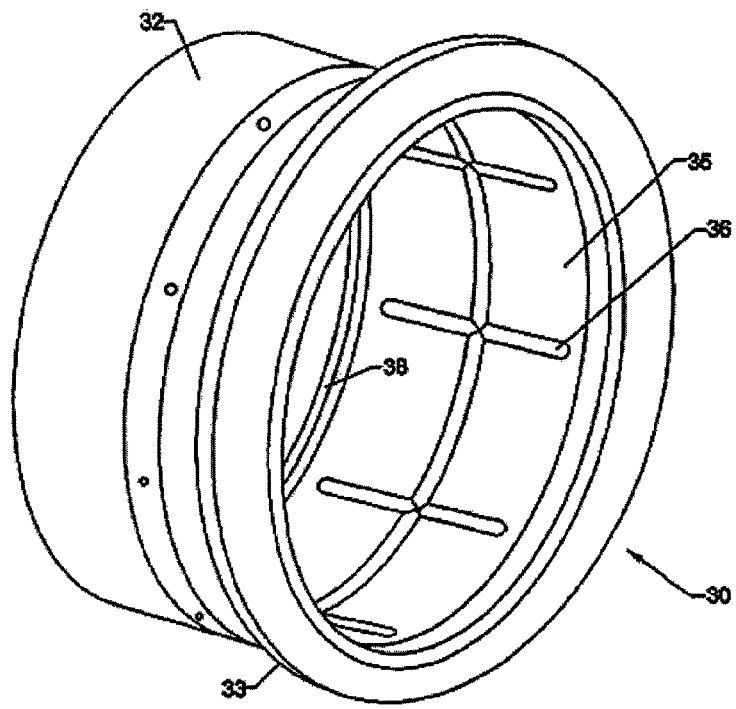
FIG. 4 is a side perspective view of a truck pivot bushing according to one embodiment of the present disclosure.
Figure 5:
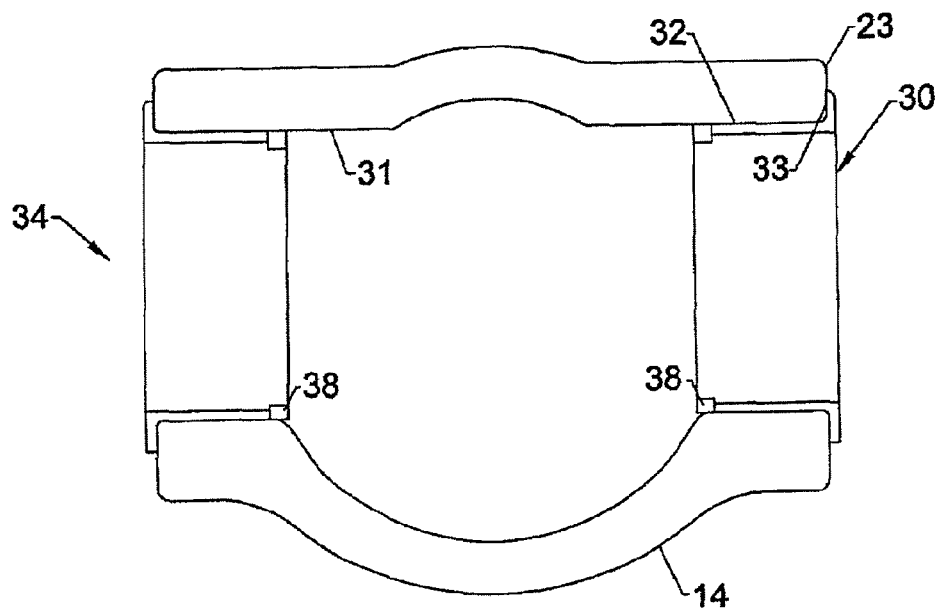
FIG. 5 is a cross-sectional view of a truck assembly according to one embodiment of the present disclosure.

FIGS. 3 and 4 show cross sectional views of the bearing assembly component 20. In this aspect, the truck assembly 14 can be formed of metal, such as AMS4596 or AMS4597 grade Cu—Ni—Sn alloy, although other variations of the Cu—Ni—Sn ratios may also be used. The truck pivot pin 24, which in one embodiment can be a tungsten carbide coated or chrome plated pin, (e.g., applied in accordance with AMS5709), extends through the cavity 34 of the truck assembly 14. A pair of truck pivot bushings 30, which can be comprised of spinodal alloy, are positioned at opposing ends of the truck assembly 14 such that flanged surfaces 33 of the pivot bushings 30 engage sidewalls 23 of the truck assembly 14. In addition, a pair of back-to-back inner cylinder pivot bushings 40 are positioned proximate the inner cylinder forks 26 such that inner cylinder assemblies (not shown) are separated from the truck assembly 14 by the pivot bushing 30 and the inner cylinder pivot bushings 40. In this regard, the truck pivot bushings 30 and inner cylinder pivot bushings 40 provide low-friction support to the truck pivot pin 24 as it rotates inside the truck assembly 14 and shock struts 12. A splined washer 28 helps secure the inner cylinder pivot bushings 40 about the pivot pin 24, and multiple pairs of brake rods 42 extend substantially parallel to the truck assembly 14.

As shown in FIG. 3, the pivot bushings 30 are interposed between the truck assembly 14 and the truck pivot pin 24. As shown in FIG. 4, each pivot bushing 30 is generally tubular, and preferably defines a plurality of lubrication distribution grooves 36 that receive and distribute grease between the truck pivot pin 24 and the pivot bushings 30 so that the pivot pin 24 is rotatable relative to the truck assembly 14. Each pivot bushing 30 also includes an outer surface 32 that is positioned proximate the inner surface 31 of the truck assembly 14 in a press-fit or interference fit so that the pivot bushing 30 does not move relative to the truck assembly 14. A seal 38 is disposed proximate the lubrication distribution grooves 36 such that grease or other lubricant is prevented from escaping. According to one embodiment, the seal 38 is formed from an elastomer, although other materials could also be used to form the seal. As shown, each pivot bushing 30 engages a sidewall 23 of the truck assembly 14 and an adjacent inner cylinder pivot bushing 40 to further seal the pivot bushing and the truck assembly 14.

Figure 7:
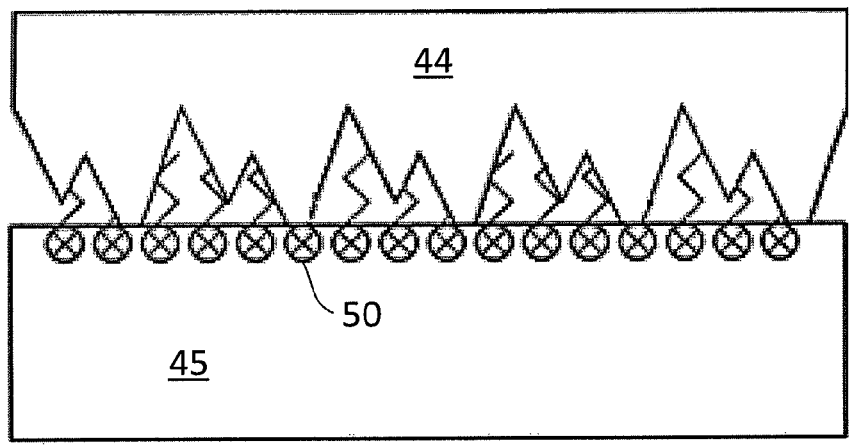
FIG. 7 is a cross-sectional view of a bearing assembly according to one embodiment of the present disclosure.
Figure 8:
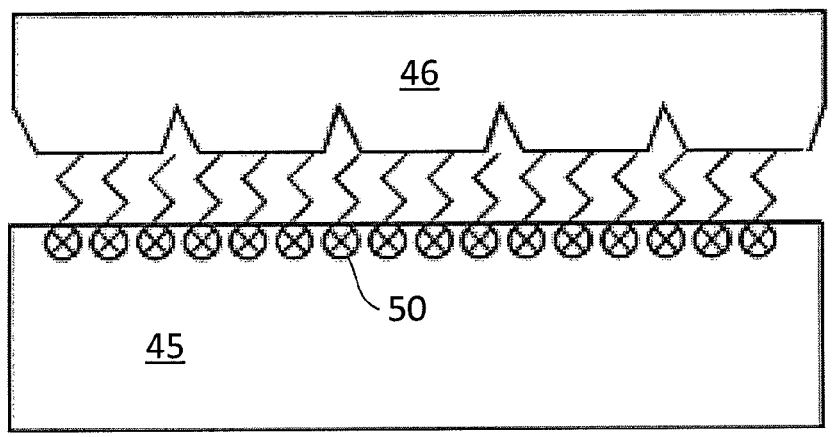
FIG. 8 is a cross-sectional view of the bearing assembly according to one embodiment of the present disclosure.

According to one embodiment, the inner surface 35 of the pivot bushing 30 is coated with lubricant composition 50. It is also possible to apply the relatively thin coating of present lubricant composition 50 on both the inner surface 35 of the pivot bushing 30 (e.g., the wearing material) and the outer surface of the pivot pin 24 (e.g., the wear surface). Alternatively, only the outer surface of the pivot pin 24 may be coated with the present lubricant composition 50, although in one aspect, only the inner surface 35 of the pivot bushing 30 can include the present lubricant composition 50 as shown in FIGS. 7 and 8. Advantageously, the space defined by the pivot bushing 30 and the pivot pin 24 is occupied by the present lubricant composition 50 so as to provide high resistance to extreme dynamic bearing pressures and temperatures.

The combination of spinodal alloy comprising a relatively thin coating of the present lubricant composition 50 coupled with the surface roughness of the wear surface as disclosed by the present disclosure is unexpected and surprising as well as contrary to conventional wisdom as to lubrication and methods for such systems. In this regard, it has been discovered that applying a relatively thin coating, such as about 0.005 inch, of the present lubricant composition 50 in combination with a measured surface roughness Rq (RMS) less than 3 uin and/or Rmax less than 30 uin and/or Rz less than 20 uin between the pivot bushing 30 and the pivot pin 24 allows dynamic bearing pressures to be increased dramatically to a level that approaches the allowable pressures for the base bearing material providing essentially superlubricious function and near zero-friction. More particularly, the relatively thin layer of coating of the present lubricant composition 50 has a friction coefficient of 0.01 or less, whereas conventional grease lubricants typically employed in such systems have a friction coefficient of about 0.20 or higher.

Accordingly, the bearing assembly component 20 according to the present disclosure can operate longer under extreme conditions, such as when landing an aerospace vehicle on very rough runways where the bearing receives severe oscillations and sliding velocities. Specifically, the bearing assembly component 20 according to the present disclosure reduces the friction-generated heat sufficiently to substantially reduce or eliminate damage to the truck assembly 14 or inner cylinder fork 26 assembly.

Another advantage of the bearing assembly component 20 according to the present disclosure is that the combination of instant lubricant composition 50 can be applied in existing bearing assemblies, such as those found in an aerospace vehicle's landing gear assemblies, without having to redesign or otherwise alter the assemblies. Thus, existing gear assemblies, e.g., an aerospace vehicle's landing gear, can easily be retrofitted with the presently disclosed system of bearing material-lubricant-surface roughness as in bearing assembly component 20 of the present disclosure, which is significantly less expensive than redesigning, altering, or replacing the assembly or bearing configuration. In addition, the bearing assembly component 20 of the present disclosure requires less frequent maintenance compared to conventional bearings operating under similar conditions, which substantially reduces maintenance man hours, downtime, and overall operating costs. Indeed, it has been discovered that an improvement in life span is achieved via testing in comparison to conventional grease-lubricated bearings by employing the systems, compositions, and methods of the present disclosure to truck pivot joint bearings in large jet aircraft or other aerospace vehicle's landing gear assemblies. Moreover, the present systems, compositions, and methods are applicable for low-temperature operations, e.g. for −65° F., and for high temperature conditions, e.g., 200-350° F.

Figure 6:
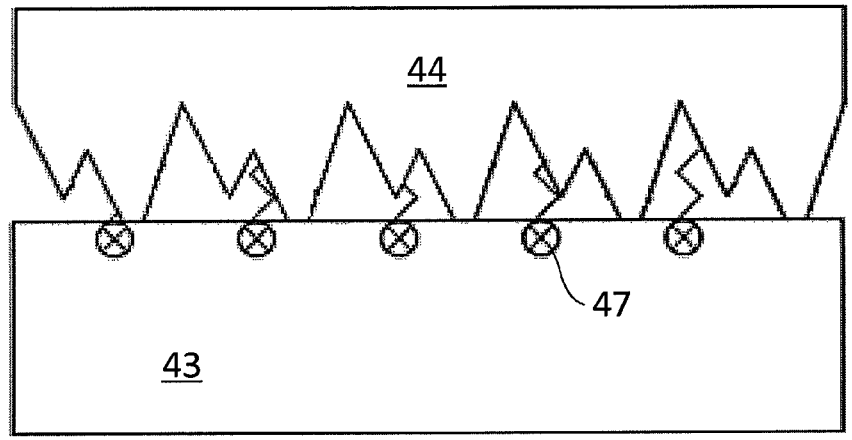
FIG. 6 is a cross-sectional view of a conventional bearing assembly.

With reference now to FIG. 6, a conventional joint assembly is shown having a standard wear surface 44 with surface roughness of approximately 4-8 microinches Ra engaging a wearing surface 43 having low density of additives 47 associated with wearing material with a bonding strength varying between strong and weak. The high surface roughness of the wear surface 44 leads to higher metal-to-metal contact.

With reference now to FIG. 7, an improved joint assembly is shown, having the same wear surface 44 and surface roughness as in FIG. 6, but with wearing material 45 being a tin-containing spinodal alloy and having lubricant composition 50 with boron-containing additives having an affinity for tin. This configuration creates an ultra high density, ultra strong wear layer which reduces friction by having additives carry much of the load. This joint assembly has much higher wear resistance and lower friction than the joint assembly depicted in FIG. 6. Nonetheless, the high surface roughness of wear surface 44 can breakthrough boundary layers of lubricant between the surfaces in certain regions creating some friction and/or heat.

With reference now to FIG. 8, a further improved joint assembly is shown, having a wear surface 46 that is smoothed to a measured surface roughness of less than about 3 microinches (uin) and with the wearing surface 45 being a tin-containing spinodal alloy and having lubricant composition 50 with boron-containing additives having an affinity for tin. This configuration also creates an ultra high density, ultra strong wear layer which reduces friction by having additives carry more of the load. This joint assembly has higher wear resistance and lower friction than the joint assembly depicted in FIG. 7 as the smoother surface roughness of the wearing surface 46 eliminates or prevents breakthrough of the lubricant boundary layer between the two surfaces reducing or eliminating friction to near zero levels and/or heat during use. The embodiment depicted in FIG. 8 can be further modified such that both contacting surfaces are spinodal alloys and one or both of the contacting surfaces can comprise lubricating composition 50.

Figure 9:
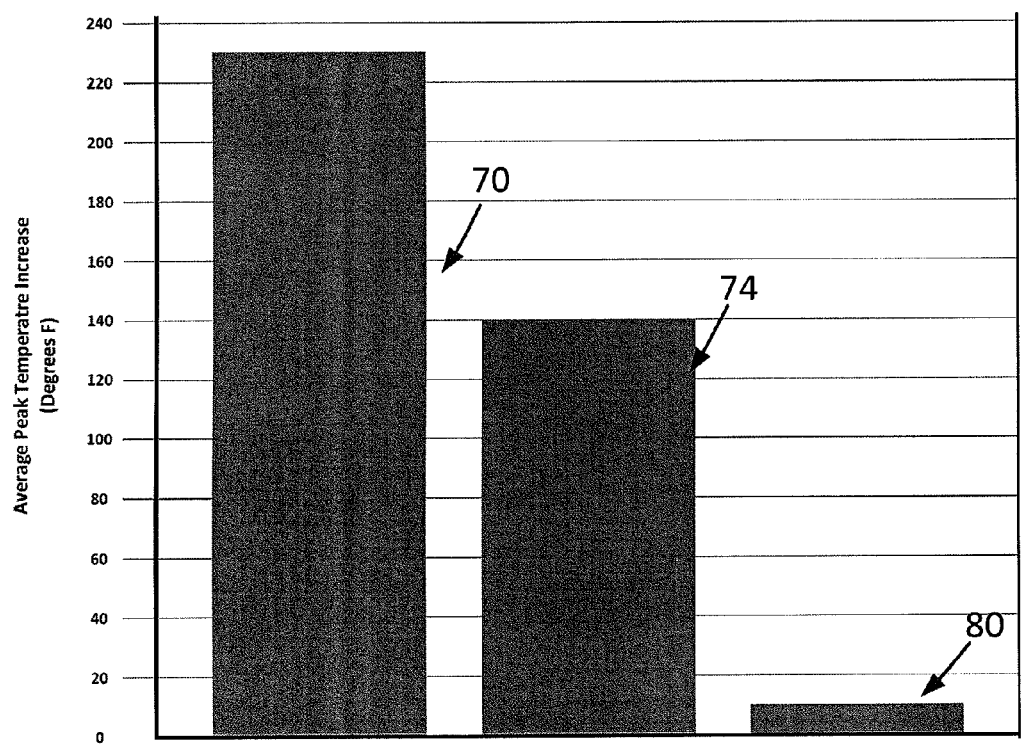
FIG. 9 is a graphical representation of average peak temperatures increase for controls and material and lubricant composition embodiments of the present disclosure.
Figure 10:
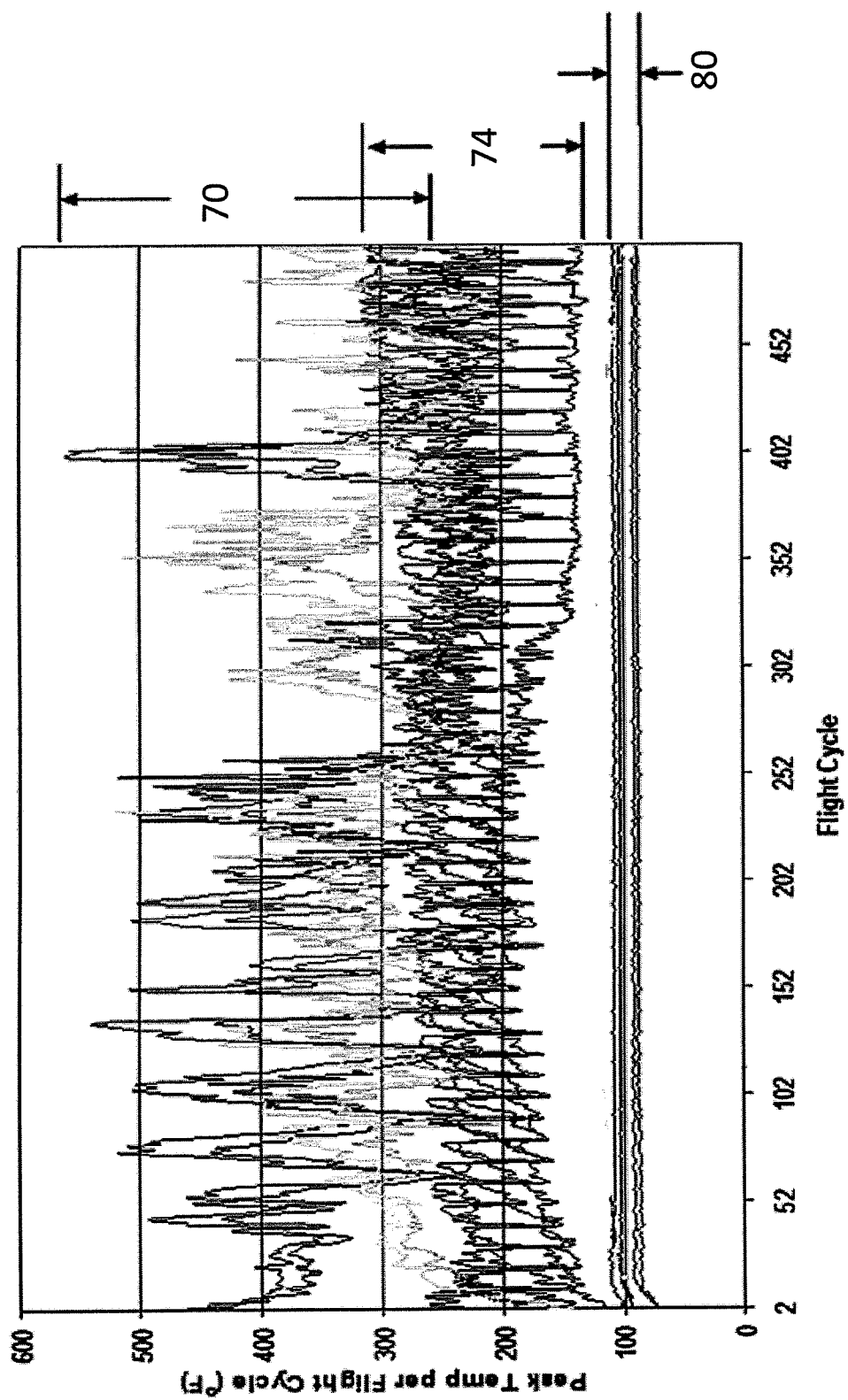
FIG. 10 is a graphical representation of peak temperatures for controls and material and lubricant composition embodiments of the present disclosure.

With reference now to FIGS. 9 and 10, average peak and peak temperatures (degrees Fahrenheit) for different materials/lubricant examples were determined via a High Energy Sliding Wear Test using loads and speeds up to approximately $10^6$ PSI-feet/min PV (pressure×velocity) to simulate approximately 500 take-off and landing cycles. Average peak increase and peak temperatures are shown graphically in FIGS. 9 and 10 respectively. Comparative Example 70 represents a conventional aluminum-nickel-bronze wearing material/wear surface ground to 7-8 microinches Ra (the arithmetic average of the measured roughness profile) employing an extreme-wear grease (e.g., ROYCO 11MS® grease) that attains an average peak temperature increase of about 230° F. Comparative Example 74 represents a copper-nickel-tin wearing material in combination with a wear surface ground to a 7-8 microinches Ra employing boron additive comprising grease (e.g., BRAYCOTE 3214® grease) that attained an average peak temperature increase of about 140° F. Example 80 represents an embodiment of the present disclosure whereby a copper-nickel-tin wearing material in combination with a wear surface ground to less than 3 microinches Rq, 30 microinches Rmax, and 20 microinches Rz, employing a boron-containing grease (e.g., BRAYCOTE 3214® grease) that attained an average peak temperature increase of about 10° F. and coefficient of friction less than about 0.01 mu to about $10^{-3}$ mu. Thus, the combination of tin-containing spinodal alloy/wear surface with a measured surface roughness of less than 3 microinches/lubricant comprising additives with an affinity for tin, e.g., boron-containing additives provided improved performance to the bearing system, characteristic of a superlubricious, near zero friction system.

The use of the above lubricant compositions in combination with the bushing materials reduced or eliminated the rough runway issues for at least some aircraft. This accomplishment resolves a 20+ year problem that has cost aircraft manufacturers and their customers considerable expense and allocation of time. Other applications of the instant disclosure include its use in draw/swing bridges, and other very-low friction bearings—whereby changing to the presently disclosed systems can greatly reduce frictions required to operate said systems.

Many modifications and other embodiments of the present disclosure will come to mind to one skilled in the art to which this present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. For example, the teachings of the present disclosure, namely a bearing assembly component 20 having the relatively thin lubricant composition 50 and defined average surface roughness of the wearing material used in combination in the space defined between the inner and outer members of a bearing assembly, can be applied to many industries in addition to the aerospace industry where lower friction bearings are desired. In addition, the teachings of the present disclosure can be applied to a broad range of applications, including applying the combination to a nut and bolt combination, or similar applications. Although specific terms are employed herein, they are used in a generic and descriptive sense only and not for purposes of limitation.

I claim:

1. A bearing assembly comprising:
   a wearing surface formed from an alloy including tin;
   a wear material configured to be contacted by the wearing surface during use;
   a lubricant composition comprising one or more additives having an affinity for tin; and
   wherein the wearing surface having an operating wearing surface having a measured root mean squared surface roughness (Rq) less than 3 microinches (uin) to about 0, and/or a maximum surface roughness (Rmax) less than 30 uin to about 0 and/or an average maximum height surface roughness (Rz) less than 20 uin to about.

2. The bearing assembly of claim 1, wherein the wearing surface or the wear material is a spinodal alloy.

3. The bearing assembly of claim 2, wherein the spinodal alloy comprises copper, nickel, and tin.

4. The bearing assembly of claim 1, wherein the wearing material has an initial wearing surface having a measured root mean squared surface roughness (Rq) greater than 3 microinches (uin), and/or greater than a maximum surface roughness (Rmax) of 30 uin to and/or an average maximum height surface roughness (Rz) greater than 20 uin, wherein the initial surface transitions to the operating surface by operating under load.

5. The bearing assembly of claim 1, wherein the wear material has a surface having a measured root mean squared surface roughness (Rq) less than 3 microinches (uin) to about 0, and/or a maximum surface roughness (Rmax) less than 30 uin to about 0 and/or an average maximum height surface roughness (Rz) less than 20 uin to about 0.

6. The bearing assembly of claim 5, wherein the Rq is less than 1.5 uin.

7. The bearing assembly of claim 1, wherein at least a portion of the surface of the wear material comprises tungsten carbide or a chrome coating.

8. An assembly comprising:
   a pair of members movable relative to one another, the pair including a first member and a second member that define a space therebetween, at least one of the first member or the second member being a spinodal alloy comprising copper, nickel, and tin; and
   at least one of the first member or the second member having a measured root mean squared surface roughness (Rq) less than 3 microinches (uin) to about 0, and/or a maximum surface roughness (Rmax) less than 30 uin to about 0 and/or an average maximum height surface roughness (Rz) less than 20 uin to about 0; and
   a lubricant composition positioned in the space, the lubricant composition comprising one or more boron or borate additives.

9. A bearing assembly for a truck pivot joint in a landing gear assembly, the bearing assembly comprising:
   a metallic truck assembly defining an opening therein;
   a pin rotatably positioned in the opening of the truck assembly, the pin having a measured root mean squared surface roughness (Rq) less than 3 microinches (uin) to about 0, and/or a maximum surface roughness (Rmax) less than 30 uin to about 0 and/or an average maximum height surface roughness (Rz) less than 20 uin to about 0; and
   a truck pivot bushing comprised of a spinodal alloy including tin, the truck pivot bushing positioned at least partially in the opening defined by the truck assembly, the truck pivot bushing having an inner surface proximate the pin such that a space is defined between the inner surface of the truck pivot bushing and the pin, at least a surface of the pin or the truck pivot bushing having a coating of a lubricant composition comprising a boron or borate additive occupying the space defined between the pivot bushing and the pin.

10. A method of providing superlubricious performance of a bearing assembly, comprising:
    contacting, with a lubricant composition comprising one or more additives having an affinity for tin, at least a surface of a wear surface or a wearing surface, the wear surface configured to be contacted by the wearing surface during use, the wear surface having a a measured root mean squared surface roughness (Rq) less than 3 microinches (uin) to about 0, and/or a maximum surface roughness (Rmax) less than 30 uin to about 0 and/or an average maximum height surface roughness (Rz) less than 20 uin to about 0, and the wearing surface formed from an alloy including tin.

11. The method of claim 10, further comprising providing, as the wearing surface or the wear surface, a spinodal alloy comprising copper, nickel, and tin.

12. The method of claim 10, further comprising providing the wearing surface with an initial wearing surface having a measured root mean squared surface roughness (Rq) greater than 3 microinches (uin), and/or greater than a maximum surface roughness (Rmax) of 30 uin to and/or an average maximum height surface roughness (Rz) greater than 20 uin, the method comprising breaking-in the initial wearing surface by operating under load to an operating wearing surface having a measured root mean squared surface roughness (Rq) less than 3 microinches (uin) to about 0, and/or a maximum surface roughness (Rmax) less than 30 uin to about 0 and/or an average maximum height surface roughness (Rz) less than 20 uin to about 0.

13. The method of claim 10, comprising providing one or more boron or borate additives as the one or more additives having an affinity for tin.

14. The method of claim 10, further comprising providing the wear material with a surface comprising tungsten carbide or a chrome coating.

15. The method of claim 10, further comprising providing the wear material having a measured root mean squared surface roughness (Rq) less than 1.5 microinches (uin).

16. The method of claim 10, further comprising configuring the bearing assembly to a component of an aerospace vehicle.

* * * * *